United States Patent
Gopalakrishnan et al.

(10) Patent No.: US 11,995,038 B2
(45) Date of Patent: May 28, 2024

(54) DATA CRITICALITY-BASED NETWORK POLICY CREATION AND CONSUMPTION

(71) Applicant: VMware LLC, Palo Alto, CA (US)

(72) Inventors: Sriram Gopalakrishnan, Pune (IN); Hrishikesh Ghatnekar, Pune (IN)

(73) Assignee: VMware LLC, Palo Alto, CA (US)

( * ) Notice: Subject to any disclaimer, the term of this patent is extended or adjusted under 35 U.S.C. 154(b) by 122 days.

(21) Appl. No.: 17/571,431

(22) Filed: Jan. 7, 2022

(65) Prior Publication Data

US 2023/0153270 A1 May 18, 2023

(30) Foreign Application Priority Data

Nov. 17, 2021 (IN) .............................. 202141052777

(51) Int. Cl.
| | | |
|---|---|---|
| G06F 16/17 | (2019.01) | |
| G06F 9/455 | (2018.01) | |
| G06F 16/13 | (2019.01) | |
| G06F 21/62 | (2013.01) | |
| H04L 9/40 | (2022.01) | |
| H04L 43/028 | (2022.01) | |
| H04L 43/50 | (2022.01) | |

(52) U.S. Cl.
CPC ...... *G06F 16/1734* (2019.01); *G06F 9/45558* (2013.01); *G06F 16/137* (2019.01); *G06F 21/6218* (2013.01); *G06F 21/6245* (2013.01); *H04L 43/028* (2013.01); *H04L 43/50* (2013.01); *H04L 63/02* (2013.01); *H04L 63/1416* (2013.01); *G06F 2009/45579* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 9,300,693 | B1 * | 3/2016 | Manmohan | G06F 9/45558 |
| 10,148,694 | B1 * | 12/2018 | Sarin | H04L 63/14 |
| 10,819,748 | B2 * | 10/2020 | Sarin | G06F 21/85 |
| 2018/0181754 | A1 * | 6/2018 | Gunda | G06F 21/602 |
| 2019/0012476 | A1 * | 1/2019 | Dorogoy | G06F 21/60 |

OTHER PUBLICATIONS

Non-Published Commonly Owned Related U.S. Appl. No. 17/571,433 with similar specification, filed Jan. 7, 2022, 48 pages, VMware, Inc.

* cited by examiner

*Primary Examiner* — Dawaune A Conyers
(74) *Attorney, Agent, or Firm* — Quarles & Brady LLP

(57) ABSTRACT

Some embodiments of the invention provide a method of performing services on a host computer on which a machine executes. The method sends, to a file inspector, a first set of data associated with an event detected on the machine that is associated with a file stored on the machine. The method receives, from the file inspector, indication that the file stores confidential information. The method sends, to a context engine executing on the host computer separately from the machine, a second set of data associated with the file, the context engine storing the second set of data for subsequent access by a service engine that executes on the host computer separately from the machine, the service engine using the second set of data to perform a service operation on data messages associated with the machine.

20 Claims, 8 Drawing Sheets

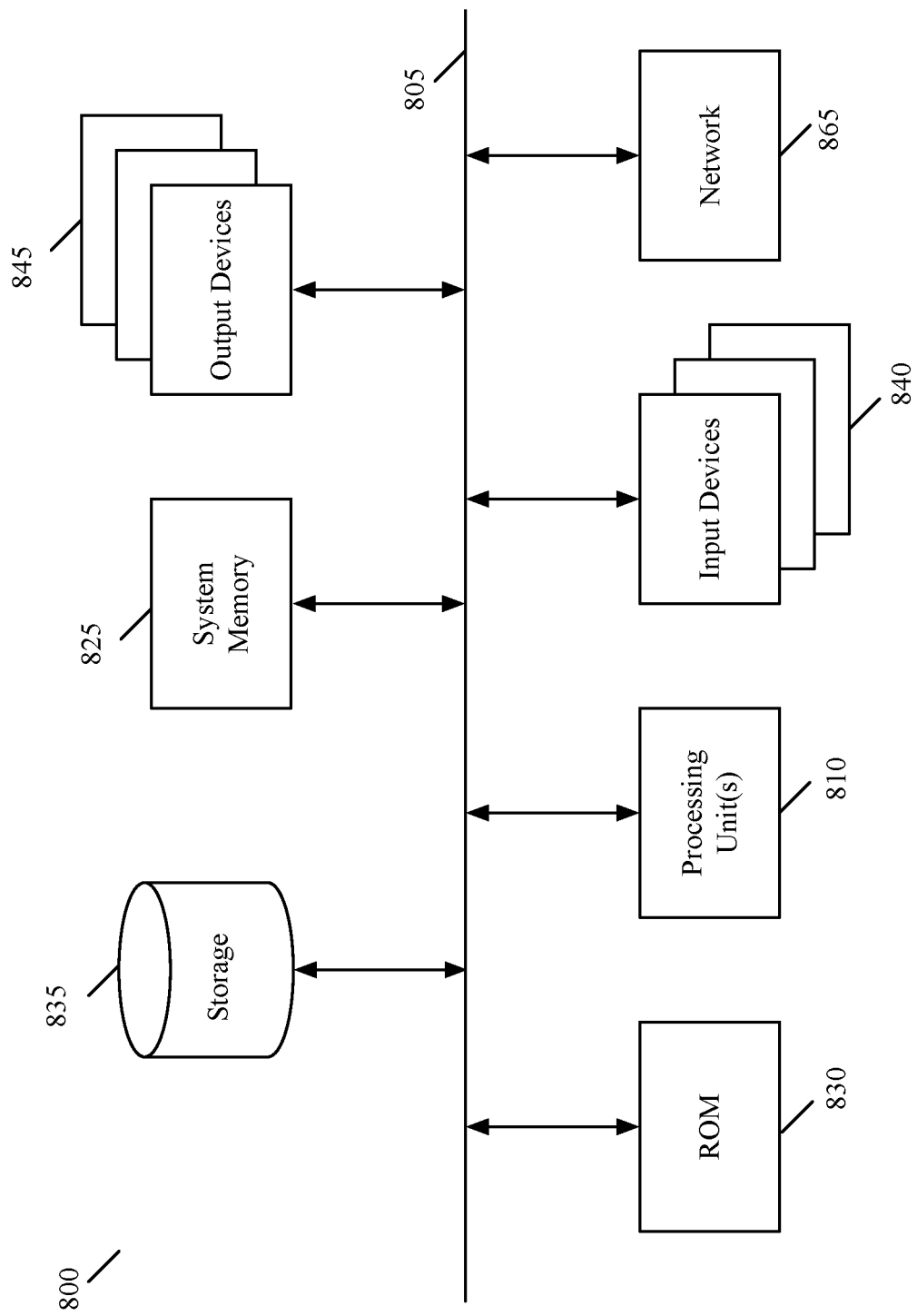

DATA CRITICALITY-BASED NETWORK POLICY CREATION AND CONSUMPTION

BACKGROUND

Today, traditional data loss prevention (DLP) solutions enable users to configure policies specifying data that needs to be treated as critical, and to flag violations when usage of said data is not conforming to the defined policies. Such policies present challenges, as these traditional DLP stand-alone solutions are not sufficient on their own, and must be combined with other features, like deep packet inspection and intrusion detection and prevention. However, such features, like deep packet inspection, require large amounts of performance overhead, and policies are typically configured for protocols (e.g., FTP and SMTP) for which users are willing to take a performance hit.

BRIEF SUMMARY

Some embodiments of the invention provide a method of performing services on a host computer on which a machine executes. In some embodiments, the method is performed by a guest introspection (GI) agent that executes on the machine. The GI agent sends, to a file inspector, a first set of data associated with an event detected on the machine that is associated with a file stored on the machine. In response to sending the first set of data to the file inspector, the GI agent receives an indication from the file inspector that the file stores confidential information. The GI agent then sends a second set of data associated with the file to a context engine executing on the host computer separately from the machine. The context engine stores the second set of data for subsequent access by service engines executing on the host computer separately from the machine for use in performing service operations on data messages associated with the machine.

In some embodiments, the detected event can include a file access event, a file storage event, or a file interception event, and the first set of data sent to the file inspector by the GI agent includes contents of the file and a process identifier associated with the detected event. The file inspector, in some embodiments, is a data loss prevention (DLP) engine that executes on the host computer separately from the machine or outside of the host computer. In some embodiments, the GI agent receives a response from the DLP engine indicating a file has confidential information, the GI agent caches the file and adds an identifier associated with the file and the process identifier associated with the detected event to a list of files having confidential information.

The second set of data provided to the context engine, in some embodiments, includes a five-tuple identifier (i.e., source and destination network addresses, source and destination ports, and protocol) associated with the data messages, a process hash identifying a process associated with the event, and the indication that the file stores confidential information. In some embodiments, the context engine provides to service engines executing on the host computer one or more service rules that include flow identifiers and indications of whether the flow identifiers are associated with confidential information. Upon receipt of a data message, in some embodiments, a service engine matches header values of the data message with a flow identifier included in a service rule, and uses the indication to determine that the data message is associated with confidential information.

In some embodiments, the service engines can include a firewall engine, a deep packet inspection (DPI) engine (also referred to herein as a deep packet inspector), an intrusion detection system (IDS) engine, and an intrusion prevention system (IPS) engine. When the service engine is a firewall engine, the service operation, in some embodiments, includes blocking any data messages associated with confidential data, and allowing any data messages not associated with confidential data. Also, in some embodiments, the firewall engine performs a redirect operation to redirect data messages associated with confidential data to a DPI engine for deep packet inspection. In some embodiments, an IDS engine sends an alert to an administrator when it determines a data message is associated with confidential data based on an analysis of the data message's payload. The IPS engine, in some embodiments, determines whether to generate a log of the data message, and/or to block the data message based on whether the data message is associated with confidential data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 8 conceptually illustrates a computer system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of performing services on a host computer on which a machine executes. In some embodiments, the method is performed by a guest introspection (GI) agent that executes on the machine. The GI agent sends, to a file inspector, a first set of data associated with an event detected on the machine that is associated with a file stored on the machine. In response to sending the first set of data to the file inspector, the GI agent receives an indication from the file inspector that the file stores confidential information. The GI agent then sends a second set of data associated with the file to a context engine executing on the host computer separately from the machine. The context engine stores the second set of data for subsequent access by service engines executing on the host computer separately from the machine for use in performing service operations on data messages associated with the machine.

In some embodiments, the detected event can include a file access event, a file storage event, or a file interception event, and the first set of data sent to the file inspector by the GI agent includes contents of the file and a process identifier associated with the detected event. The file inspector, in some embodiments, is a data loss prevention (DLP) engine that executes on the host computer separately from the machine or outside of the host computer. In some embodiments, the GI agent receives a response from the DLP engine indicating a file has confidential information, the GI agent caches the file and adds an identifier associated with the file and the process identifier associated with the detected event to a list of files having confidential information.

The second set of data provided to the context engine, in some embodiments, includes a five-tuple identifier (i.e., source and destination network addresses, source and destination ports, and protocol) associated with the data messages, a process hash identifying a process associated with the event, and the indication that the file stores confidential information. In some embodiments, the context engine provides to service engines executing on the host computer one or more service rules that include flow identifiers and indications of whether the flow identifiers are associated with confidential information. Upon receipt of a data message, in some embodiments, a service engine matches header values of the data message with a flow identifier included in a service rule, and uses the indication to determine that the data message is associated with confidential information.

Figure 1:
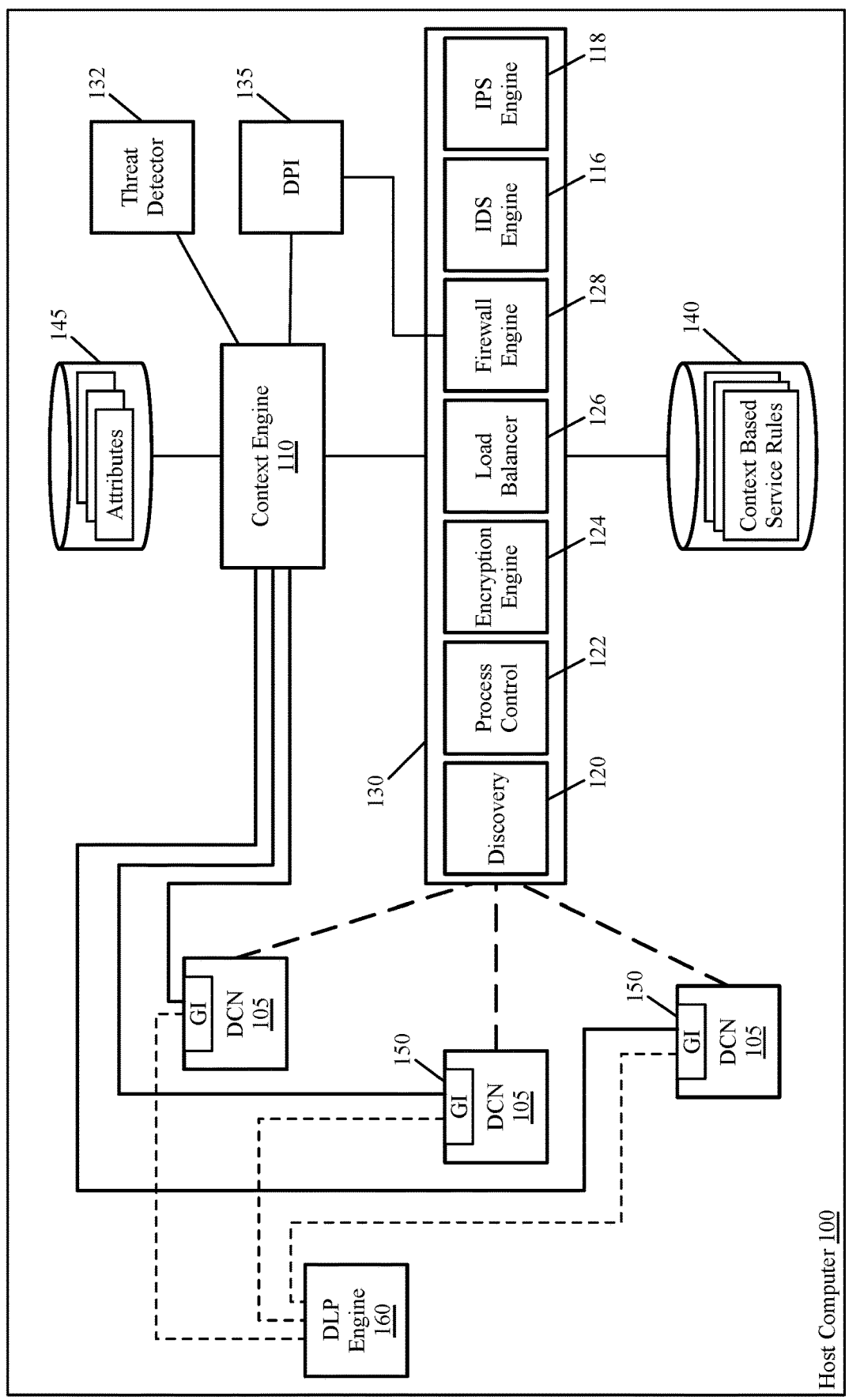
FIG. 1 illustrates a host computer that uses the context engine and context-based service engines of some embodiments of the invention.

FIG. 1 illustrates a host computer 100 that uses the context engine and context-based service engines of some embodiments of the invention. As shown, the host computer 100 includes several data compute nodes 105, a data loss prevention (DLP) solution engine 160, a context engine 110, several context-based service engines 130, a threat detector 132, and a deep packet inspection (DPI) module 135. The context-based service engines include a discovery engine 120, a process control engine 122, an encryption engine 124, a load balancer 126, a firewall engine 128, an intrusion detection system (IDS) engine 116, and an intrusion prevention system (IPS) engine 118. The host computer 100 also includes context-based service rule storages 140, and an attribute storage 145.

The DCNs are endpoint machines executing on the host computer 100. The DCNs are virtual machines (VMs) in some embodiments, containers in other embodiments, or a mix of VMs and containers in still other embodiments. On each DCN, a GI agent 150 executes in order to collect contextual attributes for the context engine 110. In some embodiments, the context engine 110 collects contextual attributes from the GI agents 150 of the DCNs on its host through a variety of different ways. For instance, in some embodiments, the GI agent on a DCN registers hooks (e.g., callbacks) with one or more modules (e.g., kernel-space modules or user-space modules) in the DCN's operating system for all new network connection events and all new process events.

Upon occurrence of a new network connection event, the GI agent 150 receives a callback from its DCN's OS and based on this callback, provides a network event identifier to the context engine 110. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, when the new network connection event involves a file stored by the DCN (e.g., an attempt to access a file), the DCN 105 first provides the contents of the file to the DLP engine 160 to evaluate whether the file contains confidential data. When the DLP engine 160 returns an indication that the file does contain confidential data, the GI agent 150 caches the file in a data storage (not shown) of the DCN 105 along with a process identifier associated with the process that initiated the new network connection event. In some embodiments, the GI agent 150 caches the file by adding an identifier for the file in a list of file identifiers for files that contain confidential information. The GI agent 150 then provides the indication that the file contains confidential information to the context engine 110 when providing the network event identifier.

The GI agent 150, in some embodiments, provides file contents to the DLP engine 160 on demand rather than upon access (e.g., upon a detected attempt to access a file stored by a DCN 105). For instance, in some embodiments, before any files have been accessed, the GI agent 150 may be configured to preemptively provide file contents for each file stored by the DCN 105 to the DLP engine 160 for analysis, and adds identifiers associated with files that the DLP engine determines to have confidential information to the list stored on the DCN for later use. Consequently, when the GI agent 150 detects an event involving a file stored by the DCN 105, the GI agent 150 can determine whether an identifier for the file is already present on the list and includes the information as part of the attribute set associated with the network event identifier provided to the context engine 110 without have to consult the DLP engine 160.

In addition to identifying whether files have confidential information, the DLP engine 160 in some embodiments also specifies a level of criticality for the files having confidential information. In some embodiments, the levels of criticality include confidential, internal, and public, with confidential being the most critical, and public being the least critical. The DLP engine 160 specifies the level of criticality for a file using a color-coding system, in some embodiments, with each level of criticality having a corresponding color (e.g., red corresponding to confidential, orange corresponding to internal, and yellow corresponding to public). In some embodiments, the context engine 110 uses the criticality level specified by the DLP engine 160 to mark the network connections associated with detected events, thereby enabling other service engines 130, 132, and 135 to enforce service rules based on the criticality of the data.

In some embodiments, the context engine directs the GI agent 150 to collect from the OS modules additional process parameters that are associated with the process identifier (ID) that it received with the network event. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of using the process identifier to query the GI agent 150 for additional process parameters associated with a network event, the context engine 110 in other embodiments receives all the process parameters associated with a network event in one shot when the GI agent reports the network event to the context engine.

The OS of the DCN in some embodiments holds up a new network event (i.e., does not start sending data messages for the network event) until the GI agent 150 on that DCN directs it to proceed with processing the network event. In some of these embodiments, the GI agent 150 only allows the OS to proceed with processing the network event after the context engine 110 has collected all the needed attributes for this event (e.g., after receiving a message from the context engine that specifies that it has received all the process or network attributes that it needs for the new network event).

In some embodiments, the context engine 110 uses the process hash that it receives from the GI agent 150 to identify the name and version of the application (i.e., the software product) to which the process belongs. To do this, the context engine 110 in some embodiments stores process hashes and associated application names/versions, compares the process hash that it receives from the GI agent with the stored process hashes to identify a matching hash, and then uses the application name/version of the matching hash as the application name and version of the process associated with the event.

In some embodiments, the context engine 110 obtains the process hashes and application names/versions from one or more network or compute managers, which may operate on another device or computer. In other embodiments, the context engine provides the hash associated with a process identifier to a network or compute manager, which then matches this hash to its process hash records and provides the application name/version of the associated process to the context engine. Once the context engine 110 obtains the application name/version associated with a network event, it can provide the name and version attributes to the attribute-based service engines, which can use this information (i.e., the application name and/or version) to identify the service rule to enforce. The context engine 110, in some embodiments, also provides an indication as to whether the process is associated with files that include confidential data for use as an additional attribute for identifying the service rule to enforce.

Upon occurrence of a process event on a DCN 105, the DCN's GI agent 150 in some embodiments receives a callback from the DCN's OS and based on this callback, provides a process event identifier to the context engine 110. The process event identifier provides a set of attributes pertaining to the process event. This set of attributes includes the process identifier in some embodiments. In some embodiments, this set also includes a user identifier and/or a group identifier (e.g., an activity directory (AD) identifier), as well as the indication as to whether the process is associated with a file that contains confidential information.

In some embodiments, the GI agent provides all the process parameters (e.g., process identifier, user ID, group ID, process name, process hash, loaded module identifiers, consumption parameters, indications of associations with confidential data, etc.) associated with a process event to the context engine when it reports the process event to the context engine. In other embodiments, the context engine directs the GI agent to collect from the OS modules additional process parameters that are associated with the process identifier that the context engine received with the process event. These additional process parameters in some embodiments are the same (e.g., process name, process hash, loaded module identifiers, consumption parameters, etc.) as the process parameters mentioned above for reported network events.

The context engine 110 of some embodiments augments the contextual attributes that it receives from the GI agents 150 with contextual attributes that it receives from other modules that execute on the host. The DPI module 135 (also referred to as the deep packet inspector) and the threat detector 132 (also referred to as the threat inspection module) are two such modules that provide contextual attributes to augment those that the context engine collects from the GI agents 150. In some embodiments, a DPI module is directed by the context engine 110 or another module (e.g., a firewall engine 128) to examine data messages of a data message flow associated with a process ID to identify the type of traffic being sent in these data messages by the application associated with the process ID. In some embodiments, the process ID is associated with a file event for a file that contains confidential data.

The identified traffic-type identity is today commonly referred to as the AppID. Also, currently there are a number of DPI modules that analyze messages of a data message flow to generate the AppID for the data message flow. In some embodiments, the context engine combines the AppID that it obtains for a network event with other context attributes that it identifies for this event, in order to produce a very rich set of attributes that the service engines can then use to perform their services. This rich set of attributes provides true application identity (i.e., the application name, application version, application traffic type, etc.), based on which the service engines can perform their services. In some embodiments, the context engine 110 uses a network event's five-tuple identifier to associate the AppID for this event's data message flow with the contextual attributes that the context engine collects from the GI agent of the DCN associated with the data message flow (e.g., of the DCN from which the data message flow emanates).

The threat detector 132 provides a threat level indicator that specifies the threat level associated with a particular application that is executing on a DCN. Once the context engine obtains a set of process parameters that specify that a process has started on a machine or is sending data messages on the machine, the context engine in some embodiments provides one or more process parameters (e.g., process hash, application name, application version, AppID, other process parameters, etc.) to the threat detection module.

This threat detection module then generates a threat level indicator (e.g., low, medium, high, etc.) for the identified process and provides this threat level indicator to the context engine. In some embodiments, the threat detector assigns a threat score to an application running on a DCN based on various application behavioral factors, such as (1) whether it does poor input validation, (2) whether it passes authentication credentials over unencrypted network links, (3) whether it uses weak password and account policies, (4) whether it stores configuration secrets in clear text, (5) whether it can transfer files, (6) whether the application is known to propagate malware, (7) whether the application is purposely evasive, (8) whether the application has known vulnerabilities, etc. In some embodiments, the threat detector is a third-party whitelisting application, such as the Bit9.

The context engine in some embodiments provides the threat level indicator produced by the threat detector 132 to one or more service engines as another contextual attribute for performing services on a new process event or the data messages of a new network event; a service engine can use the threat level indicator as another attribute to identify service rules to enforce.

The context engine 110 stores the contextual attributes that it collects for network events and process events in the attribute storage 145. In some embodiments, the context engine stores each set of contextual attributes with one or more network event identifiers and/or process identifiers. For example, in some embodiments, the context engine 110 stores the collected contextual attributes for a new process event with the process identifier, or with a reference to this identifier. The context engine then uses the process identifier to provide the collected context attributes to a service engine (e.g., the process control engine 122) that performs a service for the process event.

The context engine in some embodiments stores the collected context attributes for a new network connection event with the five-tuple identifier of the network connection event, or with a reference to this five-tuple identifier. These context attributes, in some embodiments, also include the level of criticality of a file having confidential information and associated with the new network connection. In some of these embodiments, the context engine provides to a service engine the context attributes, including the level of criticality, for a network event along with this event's five-tuple identifier. The data messages for this network event will use this five-tuple identifier, and hence the service engine can use the supplied five-tuple identifier to identify the context attributes associated with a data message flow. In some embodiments, the service engines enforce service rules based on the level of criticality specified for a flow.

The context engine employs a push model in some embodiments to distribute the collected contextual attributes to the service engines 130, while in other embodiments this engine employs a pull model to distribute these attributes to the service engines 130. In still other embodiments, the context engine employs a push model for some service engines and a pull model for other service engines. In the push model, the context engine in some embodiments distributes to a service engine the contextual attributes that it collects for a process event or a network event with the process's identifier and/or the network event's flow identifier (e.g., the flow's five-tuple identifier).

In some embodiments, the context engine distributes to the service engine only the contextual attributes that are relevant for that service engine's service rules. In other words, in these embodiments, the context engine compares each collected attribute in a set of collected attributes (e.g., for a network event or a process event) with a list of attributes used by a service engine's service rules, and discards each collected attribute that is not used by the service rules. The context engine then provides to the service engine only the subset of collected attributes (in the set of collected attributes) that is being used by the engine's service rules. In other embodiments, the service engines perform this filtering operation to discard the contextual attributes that are not needed.

In the pull model, the context engine receives queries from a service engine for the contextual attributes that the context engine has collected for a particular process or network connection. In some embodiments, the context engine receives a process ID or a flow identifier (e.g., five-tuple identifier) with a query from the service engine, and uses the received identifier to identify the attribute set that it has to provide to the service engine.

In some embodiments, the context engine generates a service token (also called a service tag) for the collection of attributes that are relevant for the service engine, and provides this service token to another module (e.g., the GI agent or another module on the host) to pass along to the service engine (e.g., pass along in a data message's encapsulating header). The service engine then extracts the service token and provides this service token to the context engine in order to identify the contextual attributes that the context engine has to provide to the service engine.

In some embodiments, the context engine 110 and the service engines 130 are all kernel space components of a hypervisor on which multiple VMs or containers execute, as further described below by reference to FIG. 2. In other embodiments, the context engine and/or one or more service engines are user space processes. For example, one or more service engines in some embodiments are service VMs (SVMs). In some embodiments, one or more service engines are in ingress datapaths and/or egress datapaths of DCNs, in order to receive access to data message flows to and from the DCNs to perform services on these data message flow. In other embodiments, one or more other modules on the host 100 intercept data messages from the ingress/egress datapaths and forward these messages to one or more service engines for these engines to perform services on the data messages. One such approach will be described below by reference to FIG. 2.

Different embodiments use different types of context-based service engines. In the example illustrated in FIG. 1, the service engines 130 include the discovery engine 120, the process control engine 122, the encryption engine 124, the load balancer 126, the firewall engine 128, the intrusion detection system (IDS) engine 116, and the intrusion prevention system (IPS) engine 118. Each of these service engines 130 has an attribute-based, service-rule storage. FIG. 1 collectively represents all the context-based, service-rule storages of these service engines with the context-based service rule storage 140 in order to simplify the illustration that is presented in this figure.

In some embodiments, each service rule in the context-based service rule storage 140 has a rule identifier for matching to a process or flow identifier to identify the rule to enforce for a process or network event. In some embodiments, the context-based service rule storage 140 is defined in a hierarchical manner to ensure that a rule check will match a higher priority rule before matching a lower priority rule. Also, in some embodiments, the context-based service rule storage 140 contains a default rule that specifies a default action for any rule check, as further explained below.

The firewall engine 128 performs firewall operations on data messages sent by or received for the DCNs 105. These firewall operations are based on firewall rules in the context-based service rule storage 140. Some of the firewall rules are defined purely in terms of layer 2-layer 4 attributes, e.g., in terms of five-tuple identifiers. Other firewall rules are defined in terms of contextual attributes that can include one or more of the collected contextual attributes, such as whether a data message is associated with confidential data, application names, application versions, AppID, resource consumption, threat level, user ID, group ID, etc. Yet other firewall rules in some embodiments are defined in terms of both L2-L4 parameters and contextual attributes. As the firewall engine 128 can resolve firewall rules that are defined by reference to contextual attributes, this firewall engine is referred to as a context-based firewall engine.

In some embodiments, the context-based firewall engine 128 can allow, block or re-route data message flows based on any number of contextual attributes, because its firewall rules can be identified in terms of any combination of the collected contextual attributes. For example, this firewall engine can block all email traffic from chrome.exe when the user is part of a Nurse user group, when one firewall rule specifies that data messages should be blocked when the flow is associated with the Nurse group ID, the AppID identifies the traffic type as email, and the application name is Chrome. Similarly, context based firewall rules can block data message flows associated with video conferences, online video viewing, or use of old versions of software. Examples of such rules would block all Skype traffic, block all YouTube video traffic, block all HipChat audio/video conferences when an application version number is older than a particular version number, block data message flows for any application with a high threat score, etc. In another example, a firewall rule can block data message flows associated with files that contain confidential data.

The IDS engine 116 and IPS engine 118 provide intrusion detection and prevention services based on the intrusion detection scripts and intrusion detection signatures as well as contextual attributes received from the context engine 110. In some embodiments, the IDS engine 116 and IPS engine 118 also receive contextual attributes from the DPI engine 135. The IDS engine 116 of some embodiments augments the contextual attributes that it receives from the context engine 110 with contextual attributes that it receives from other modules that execute on the host 100, such as the DPI engine 135.

In some embodiments, the IDS engine 116 is configured to detect and identify ongoing attacks (e.g., ongoing advanced persistent threats (APTs)), as well as send alerts (e.g., to an administrator) when attacks are detected, while the IPS engine 118 is configured to stop identified attacks, according to some embodiments. The IDS engine 116, in some embodiments, generates a bit pattern corresponding to contextual attributes associated with a data message. The IDS engine 116 then compares the bit pattern with other bit patterns (i.e., signatures in the context-based service rules storage 140) to determine whether there are any matches. In some embodiments, when the IDS engine 116 identifies a match, it sends an alert to an administrator indicating a potential threat has been identified. The IPS engine 118, in some embodiments, is subsequently instructed to perform an intrusion prevention action based on the alert sent by the IDS engine 116. The intrusion prevention action can include logging the data message and/or blocking the data message, in some embodiments.

In some embodiments, the IDS engine 116 is a host-based IDS that is installed in the host 100 and models normal behavior and builds statistical models around that normal behavior. Typical embodiments of host-based IDSs use system calls and anomalous program behavior to detect deviant behavior. In other embodiments, the IDS engine 116 is part of a network-based IDS that is installed at various points in the network and inspects traffic passing through these points. Network-based IDSs can be hardware-based or software-based and typically inspect large amounts of data, according to some embodiments.

The load-balancing engine 126 performs load-balancing operations on data messages sent by the DCNs 105 to distribute the data message flows to different destination or service nodes in one or more destination/service node clusters. These load-balancing operations are based on load-balancing rules in the context-based service rule storage 140. In some of these embodiments, each load-balancing rule can specify one or more load-balancing criteria (e.g. a round robin criterion, a weighted round-robin criterion, etc.) for distributing traffic, and each criterion can be limited to a particular time range. In some embodiments, a load-balancing operation involves replacing a data message flow's destination network address (e.g., the destination IP address, the destination MAC address, etc.) with another destination network address.

Some of the load-balancing rules are defined purely in terms of L2-L4 attributes, e.g., in terms of five-tuple identifiers. Other load-balancing rules are defined in terms of contextual attributes that can include one or more of the collected contextual attributes, such as application names, application versions, AppID, resource consumption, threat level, user ID, group ID, etc. Yet other load-balancing rules in some embodiments are defined in terms of both L2-L4 parameters and contextual attributes. As the load-balancing engine 126 can resolve load-balancing rules that are defined by reference to contextual attributes, this load-balancing engine is referred to as a context-based load balancer.

In some embodiments, the context-based load balancer 126 can distribute the data message flows based on any number of contextual attributes, because its load-balancing rules can be identified in terms of any combination of the collected contextual attributes. For example, the data distribution of the load balancer 126 can be based on any combination of user and application data. Examples of such load-balancing operations include: (1) distributing data message flows associated with the Finance department on all load-balancing pools, (2) redirecting all the Finance department's traffic to another pool when the primary pool for this department is down to make this department's traffic highly available, and (3) making all traffic associated with the Doctor's user group highly available. In some embodiments, the load-balancing rules can also be defined in terms of collected resource consumption, in order to distribute traffic to provide more or less resources to applications that consume a lot of resources on the DCNs.

The encryption engine 124 performs encryption/decryption operations (collectively referred to as encryption operations) on data messages sent by or received for the DCNs 105. These encryption operations are based on encryption rules in the context-based service rule storage 140. In some embodiments, each of these rules includes an encryption/decryption key identifier, which the encryption engine can use to retrieve an encryption/decryption key from a key manager on the host or operating outside of the host. Each encryption rule also specifies in some embodiments the type of encryption/decryption operation that the encryption module has to perform.

Each encryption rule also has a rule identifier. For some encryption rules, the rule identifiers are defined purely in terms of L2-L4 attributes, e.g., in terms of five-tuple identifiers. Other encryption rules are defined in terms of contextual attributes that can include one or more of the collected contextual attributes, such as application names, application versions, AppID, resource consumption, threat level, user ID, group ID, etc. Yet other encryption rules in some embodiments are defined in terms of both L2-L4 parameters and contextual attributes. As the encryption engine 124 can resolve encryption rules that are defined by reference to contextual attributes, this encryption engine is referred to as a context-based encryption engine.

In some embodiments, the context-based encryption module 124 can encrypt or decrypt the data message flows based on any number of contextual attributes because its encryption rules can be identified in terms of any combination of the collected contextual attributes. For example, the encryption/decryption operation of the encryption engine 124 can be based on any combination of user and application data. Examples of such encryption operations include: (1) encrypt all traffic from Outlook (started on any machine) to Exchange Server, (2) encrypt all communication between applications in a three tier Webserver, Application Server and Database Server, (3) encrypt all traffic originating from the Administrators Active Directory group, etc.

The process control engine 122 enforces context-based process control operations (e.g., process assessment and termination operations) on processes started on the DCNs 105. In some embodiments, whenever the context engine 110 receives a new process event from a GI agent 150 of a DCN, it provides the process parameters associated with this process event to the process control engine 122. This engine then uses the received set of process parameters to examine its context-based service rule storage 140 to identify a matching context-based, process-control rule.

The process control engine 122 can direct the context engine to direct the GI agent of the DCN to perform a process-control operation on a process. Examples of such process-control operations include (1) terminating a video conference application that has a particular version number, (2) terminating a browser that is displaying YouTube traffic, (3) terminating applications that have a high threat level score, and (4) terminating any processes that have accessed or attempt to access files containing confidential data.

The discovery engine 120 is another context-based service engine. In some embodiments, the discovery engine 120 captures new process events and new network events from the context engine, along with the contextual attributes that the context engine collects for these process and network events. As further described below, the discovery service engine then relays these events and their associated contextual attributes to one or more network managers (e.g., servers) that provide a management layer that allows network administrators to visualize events in a datacenter and specify policies for compute and network resources in the datacenter.

In relaying these events and attributes to the network management layer, the discovery module of some embodiments performs some pre-processing of these events and attributes. For example, in some embodiments, the discovery module filters some of the network or process events, while aggregating some or all of these events and their attributes. Also, in some embodiments, the discovery engine 120 directs the context engine 110 to collect additional contextual attributes for process or network events through the GI agents 150 or other modules (e.g., the DPI engine or threat detection engine), or to capture other types of events, such as file events and system events.

For example, in some embodiments, the discovery engine directs the context engine to build an inventory of the applications installed on the machines, and to periodically refresh this inventory. The discovery engine might so direct the context engine at the request of the management plane, or based on operational configurations that the management or control plane specifies for the discovery engine. In response to the request from the discovery engine, the context engine in some embodiments has each GI agent on each of its host's machines discover all installed processes on the machine, and all running processes and services on the machine. In another example, the discovery engine directs the context engine to build an inventory of files stored by the machines, along with indications as to whether each particular file contains confidential information, similar to the list kept by the machines as described above.

After building an inventory of installed applications and the running processes/services, the discovery engine of a host computer in a datacenter provides this information to the network/compute managers in the management plane. In some embodiments, the management plane collects contextual attributes from sources other than the host computer discovery and context engines. For instance, in some embodiments, the management plane collects from one or more servers compute context (e.g., cloud context from cloud vendors, or compute virtualization context by datacenter virtualization software), identity context from directory service servers, mobility context from mobility management servers, endpoint context from DNS (domain name server) and application inventory servers, network context (e.g., virtual network context from network virtualization server), etc.

By collecting the contextual information (e.g., information from the discovery and context engines and/or information from other context sources), the management plane can provide a user interface to the network/compute administrators to visualize the compute and network resources in the datacenter. Moreover, the collected contextual attributes allow the management plane to provide controls through this user interface for these administrators to specify context-based service rules and/or policies. These service rules/policies are then distributed to the host computers so that service engines on these computers can perform context-based service operations.

In some embodiments described above, the same service engine 130 (e.g., the same firewall engine 128) performs the same type of service (e.g., a firewall service) based on service rules that can be defined in terms of message flow identifiers (e.g., five-tuple identifiers) or in terms of collected contextual attributes (e.g., AppID, threat level, user identifier, group identifier, application name/version, association with confidential information, etc.) associated with the data message flows. In other embodiments, however, different service engines provide the same type of service based on the message flow identifiers (e.g., five-tuple identifiers) and based the collected contextual attributes of the data message flows. For instance, some embodiments use one flow-based firewall engine that performs firewall operations based on rules defined in terms of flow identifiers, and another context-based firewall engine that performs firewall operations based on rules defined in terms of context attributes (e.g., AppID, threat level, user identifier, group identifier, application name/version, association with confidential data, etc.).

Figure 2:
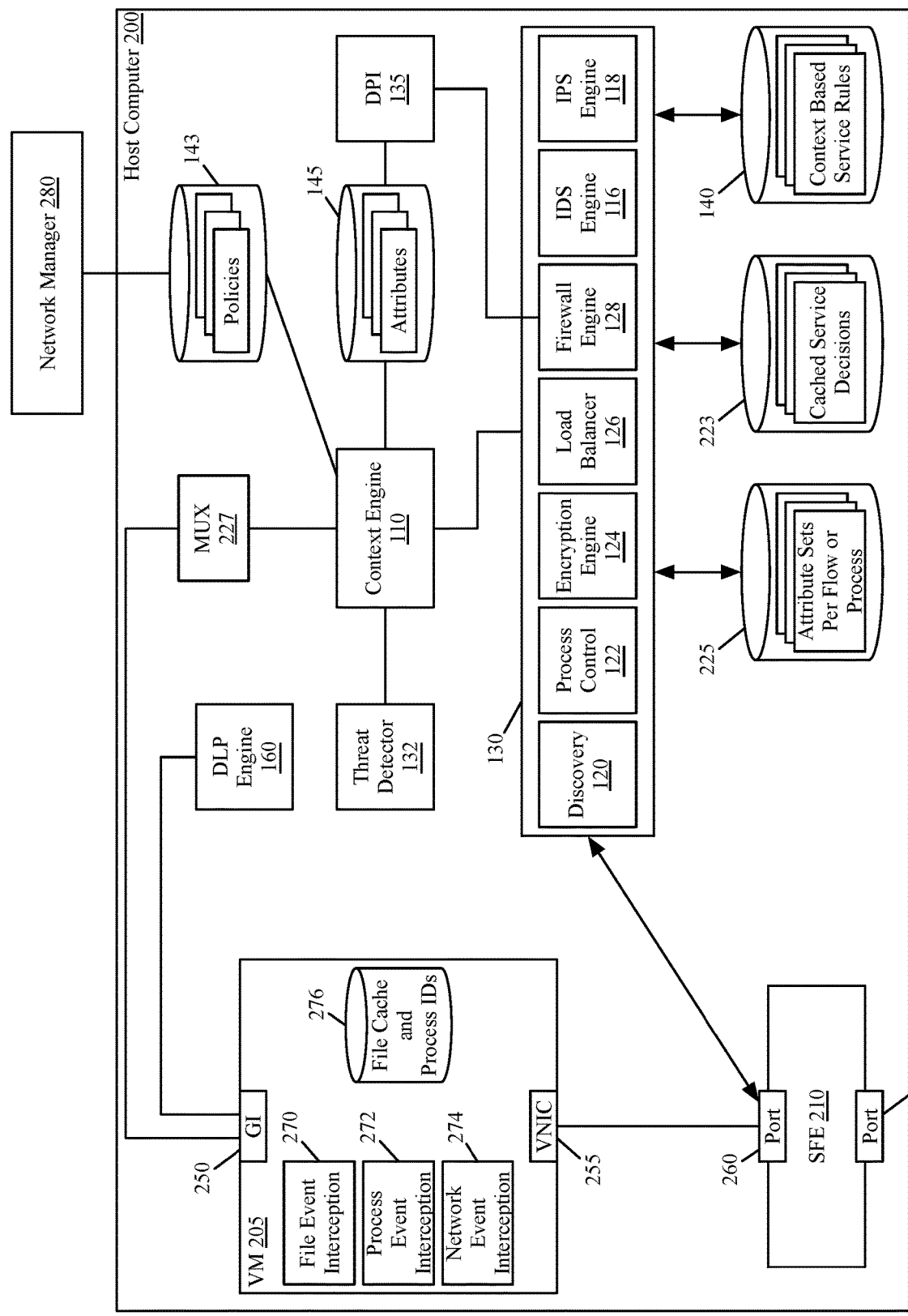
FIG. 2 illustrates a more-detailed example of a host computer that in some embodiments is used to establish a distributed architecture for configuring and performing context-rich, attribute-based services in a datacenter.

FIG. 2 illustrates a more-detailed example of a host computer 200 that in some embodiments is used to establish a distributed architecture for configuring and performing context-rich, attribute-based services in a datacenter. This host computer 200 includes many of the same components as host computer 100, such as context engine 110, DLP engine 160, service engines 130, threat detector 132, DPI module 135, context-based service rule storage 140, and context-attribute storage 145. Like in FIG. 1, the service engines 130 in FIG. 2 include the discovery engine 120, the process control engine 122, the encryption engine 124, the load balancer 126, the firewall engine 128, the IDS engine 116, and the IPS engine 118.

In FIG. 2, the DCNs are a VM 205 that executes on a hypervisor. Also, in FIG. 2, the host computer 200 includes a software forwarding element 210, an attribute-mapping storage 223, a connection state cache storage 225, a MUX (multiplexer) 227, and a context-engine policy storage 143. In some embodiments, the context engine 110, the DLP engine 160, the software forwarding element 210, the service engines 130, the context-based service rule storages 140, the connection state cache storage 225, the context-engine policy storage 143, and the MUX 227 operate in the kernel space of the hypervisor, while the VM 205 operates in the hypervisor's user space. In other embodiments, one or more service engines are user space modules (e.g., are service VMs).

In some embodiments, the VM 205 serves as a data end point in the datacenter. Examples of such machines include webservers, application servers, database servers, etc. In some cases, the VM 205 is multiple VMs that all belong to one entity, e.g., an enterprise that operates the host. In other cases, the host 200 operates in a multi-tenant environment (e.g., in a multi-tenant data center), and different VMs 205 may belong to one tenant or to multiple tenants.

As shown, the VM 205 includes a file event interception component 270 for intercepting file events initiated on the VM, a process event interception component 272 for intercepting process events initiated on the VM, and a network event interception component 274 for intercepting network events initiated on the VM. In some embodiments, when a file event is intercepted by the file event interception component 270, the GI agent 250 interacts with the DLP engine 160 to provide contents of the file associated with the file event for evaluation. The DLP engine 160, in some embodiments, responds to the GI agent 250 with an indication as to whether the file contents provided include any confidential data. The GI agent 250, in some embodiments, caches any files indicated to include confidential data, as well as a process ID associated with the file event, in the file cache and process IDs storage 276. In some embodiments, the file cache and process IDs storage 276 includes a list of file identifiers corresponding to files that include confidential information, and the process IDs associated with the files.

The GI agent 250 also interacts with the context engine 110 to provide context attribute sets to this engine, and to receive instructions and queries from this engine. The interactions between the GI agent 250 and the context engine 110 are similar to the interactions described above between the GI agents 150 and the context engine 110. However, as shown in FIG. 2, all the communication between the context engine 110 and the GI agent 250 in some embodiments are relayed through the MUX 227. One example of such a mux is the mux that is used by the Endpoint Security (EPSec) platform of ESX hypervisors of VMware, Inc.

In some embodiments, the GI agent communicates with the MUX 227 through a fast communication channel (such as VMCI channel of ESX). In some embodiments, this communication channel is a shared memory channel. As mentioned above, the attributes collected by the context engine 110 from the GI agent 250 in some embodiments include a rich group of parameters (e.g., layer 7 parameters, process identifiers, user identifiers, group identifiers, process name, process hash, loaded module identifiers, consumption parameters, etc.)

As shown, the VM 205 also includes a virtual network interface card (VNIC) 255 in some embodiments. The VNIC is responsible for exchanging messages between the VM and the software forwarding element (SFE) 210. The VNIC connects to a particular port 260 of the SFE 210. The SFE 210 also connects to a physical network interface card (NIC) (not shown) of the host. In some embodiments, the VNIC is a software abstraction created by the hypervisor of one or more physical NICs (PNICs) of the host.

In some embodiments, the SFE 210 maintains a single port 260 for each VNIC of each VM executing on the host computer 200. The SFE 210 connects to the host PNIC (through a NIC driver (not shown)) to send outgoing messages and to receive incoming messages. In some embodiments, the SFE 210 is defined to include a port 265 that connects to the PNIC's driver to send and receive messages to and from the PNIC. The SFE 210 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 260 or 265, which directs the message to be supplied to a destination VM or to the PNIC).

In some embodiments, the SFE 210 is a software switch, while in other embodiments it is a software router or a combined software switch/router. The SFE 210 in some embodiments implements one or more logical forwarding elements (e.g., logical switches or logical routers) with the SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

The ports of the SFE 210 in some embodiments include one or more function calls to one or more modules that implement special input/output (I/O) operations on incoming and outgoing messages that are received at the ports. Examples of I/O operations that are implemented by the ports 260 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNIC 255, port 265, etc.) implement the I/O function call operations instead of, or in conjunction with, the ports 260.

In some embodiments, one or more of function calls of the SFE ports 260 can be to one or more service engines 130 that process context-based service rules in the context-based service rule storages 140. Each service engine 130 in some embodiments has its own context-based service rule storage 140, attribute-mapping storage 223, and connection state cache storage 225. FIG. 2 presents just one context-based service rule storage 140, attribute-mapping storage 223, and connection state cache storage 225 for all the service engines in order not to obscure the presentation in this figure with unnecessary detail. Also, in some embodiments, when there are multiple VMs executing on the host computer, each VM has its own instance of each service engine 130 (e.g., its own instance of discovery engine 120, process control engine 122, encryption engine 124, load balancer 126, firewall engine 128, IDS engine 116, and IPS engine 118). In other embodiments, one service engine can service data message flows for multiple VMs on a host (e.g., VMs for the same logical network).

To perform its service operation for a data message flow, a service engine 130 in some embodiments tries to match the flow identifier (e.g., the five-tuple identifier) and/or the flow's associated context attribute set to the rule identifiers of its service rules in its context-based service rule storage 140. Specifically, for a service engine 130 to perform its service check operation for a data message flow, the SFE port 260 that calls the service engine supplies a set of attributes of a message that the port receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set that the service engine has stored for this flow in the attribute-mapping storage 223. As mentioned above, the context engine 110 in some embodiments supplies the context attributes for new flows (i.e., new network connection events) and for new processes to the service engines 130, along with a flow identifier (e.g., a five-tuple identifier) or a process identifier. In some embodiments, the process identifiers are associated with an indication of whether the corresponding process has accessed or attempted to access any files containing confidential information.

The context-engine policy storage 143 contains the rules that control the operation of the context engine 110. In some embodiments, the policy storage 143 includes policies provided by the network manager 280. These policies, in some embodiments, can include policies defined for the service engines 130. In some embodiments, the policies also include polices that direct the context engine to generate rules for the service engines or to direct the service engines to generate rules (e.g., when a high-threat application runs on a VM, directing the encryption engine for all the other VMs on the same host to encrypt their data message traffic). The service engines 130 in these embodiments store the context attributes that they receive from the context engine in the attribute-mapping storage 223.

In some embodiments, a service engine 130 stores the context attribute set for each new flow or new process with that flow's identifier (e.g., five-tuple identifier) or that process' identifier in the attribute-mapping storage. In this manner, the service engine can identify the context attribute set for each new flow that it receives from the SFE ports 260 by searching its attribute-mapping storage 223 for a context record that has a matching flow identifier. The context record with the matching flow identifier includes the context attribute set for this flow. Similarly, to identify the context attribute set for a process event, a service engine in some embodiments searches its attribute-mapping storage 223 for a context record with a matching process identifier. In some embodiments, the context records specify whether the process associated with the process identifier has accessed files containing confidential data.

As mentioned above, some or all of the service engines in some embodiments pull the context attribute sets for a new flow or new process from the context engine. For instance, in some embodiments, a service engine supplies a new flow's five-tuple identifier that it receives from the SFE port 260, to the context engine 110. This engine 110 then examines its attribute storage 145 to identify a set of attributes that is stored for this five-tuple identifier, and then supplies this attribute set (or a subset of it that it obtains by filtering the identified attribute set for the service engine) to the service engine.

As described above, some embodiments implement the pull model by using a service token to encode the attribute set for a new message flow. When notified of a new network connection event, the context engine 110 in some embodiments (1) collects the context attribute set for the new event, (2) filters this set to discard the attributes that are not relevant for performing one or more services on the flow, (3) stores the remaining filtering attribute subset in the attribute storage 145 along with a service token, (4) provides the service token to the GI agent 250. The GI agent 250 then causes this token to be passed to the service engine(s) in-band (e.g., in a header of the data message that the agent's VM sends to a destination) or out-of-band (i.e., separately from the data messages that the agent's VM sends to a destination).

When the service engine gets the new flow through the SFE port 260, it supplies this flow's service token to the context engine, which uses this service token to identify in its attribute storage 145 the context attributes to supply to the service engine. In the embodiments that the SFE port does not provide this service token to the service engine, the service engine first has to identify the service token by searching its data stores using the flow's identifier before supplying the service token to the context engine.

After identifying the contextual attribute set for a data message flow, the service engine 130 in some embodiments performs its service operation based on service rules that are stored in the context-based service rule storage 140. To perform its service operation, the service engine 130 matches the received attribute subset with corresponding attribute sets that are stored for the service rules. In some embodiments, each service rule in the context-based service rule storage 140 has a rule identifier and an action parameter set.

As mentioned above, the rule identifier of a service rule in some embodiments can be defined in terms of one or more contextual attributes that are not L2-L4 header parameters (e.g., are L7 parameters, process identifiers, user identifiers, group identifiers, process name, process hash, loaded module identifiers, consumption parameters, identifiers indicating an association with confidential data, etc.). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute set with the rules, the service engine compares the received attribute set with the associated identifiers of the service rules stored in the context-based service rule storage 140. Upon identifying a matching rule, the service engine 130 performs a service operation (e.g., a firewall operation, a load balancing operation, an encryption operation, other middlebox operation, etc.), based on the action parameter set (e.g., based on Allow/Drop parameters, the load balancing criteria, encryption parameters, redirect parameters, etc.) of the matching rule.

In some embodiments, the context-based service rule storage 140 is defined in a hierarchical manner to ensure that a message rule check will match a higher priority rule before matching a lower priority rule, when the message's attribute subset matches multiple rules. Also, in some embodiments, the context-based service rule storage 140 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rule storage 140 based on the message's identified context attribute set, the service engine of some embodiments stores the service rule (or a reference to the service rule) in the connection state cache storage 225, so that it can later use this service rule for subsequent data messages of the same flow.

In some embodiments, the connection state cache storage 225 stores the service rule, or a reference to the service rule, that the service engine 130 identifies for different message identifier sets (e.g., for different five-tuple identifiers that identify different data message flows). In some embodiments, the connection state cache storage 225 stores each service rule, or reference to the service rule, with an identifier (e.g., a flow's five-tuple identifier and/or a hash value of the flow's five-tuple identifier) that is generated from the matching message identifier set.

Before checking with the context-based service rule storage 140 for a particular message, the service rule engine 130 of some embodiments checks the connection state cache storage 225 to determine whether this storage has previously identified a service rule for this message's flow. If not, the service engine 130 identifies the contextual attribute set for the message flow, and then checks the context-based service rule storage 140 for a service rule that matches the message's identified attribute set and/or its five-tuple identifier. When the connection state data storage has an entry for the particular message, the service engine performs its service operation based on this service rule's action parameter set.

In the service architecture of FIG. 2, the DPI module 135 performs deep packet inspection on a data message flow at the direction of the firewall engine 128. Specifically, when the firewall engine 128 receives a new data message that is part of a new data message flow, the firewall engine in some embodiments directs the DPI module to inspect that new data message and one or more of the next few data messages in the same flow. In some embodiments, the firewall engine 128 directs the DPI module to inspect data messages determined to be associated with files containing confidential data. Based on this examination, the DPI engine identifies the type of traffic (i.e., the application on the wire) that is being sent in this data message flow, generates an AppID for this traffic type, and stores this AppID in the attribute storage 145. In some embodiments, the context attribute sets are stored in the attribute storage based on flow identifiers and/or process identifier. Accordingly, in some embodiments, the DPI engine 135 stores the AppID for a new data message flow in the attribute storage 145 based on that flow's five-tuple identifier.

In some embodiments, the context engine 110 pushes to the service engines 130 the AppID for a new data message flow once the DPI engine stores the AppID in the attribute storage 145. In other embodiments, the context engine 110 pulls the AppID from the attribute storage 145 whenever it is queried for the contextual attributes for a data message flow by a service engine. In some embodiments, the context engine 110 uses the five-tuple identifier of the flow to identify the record in the attribute storage 145 with the matching record identifier and the AppID.

Figure 3:
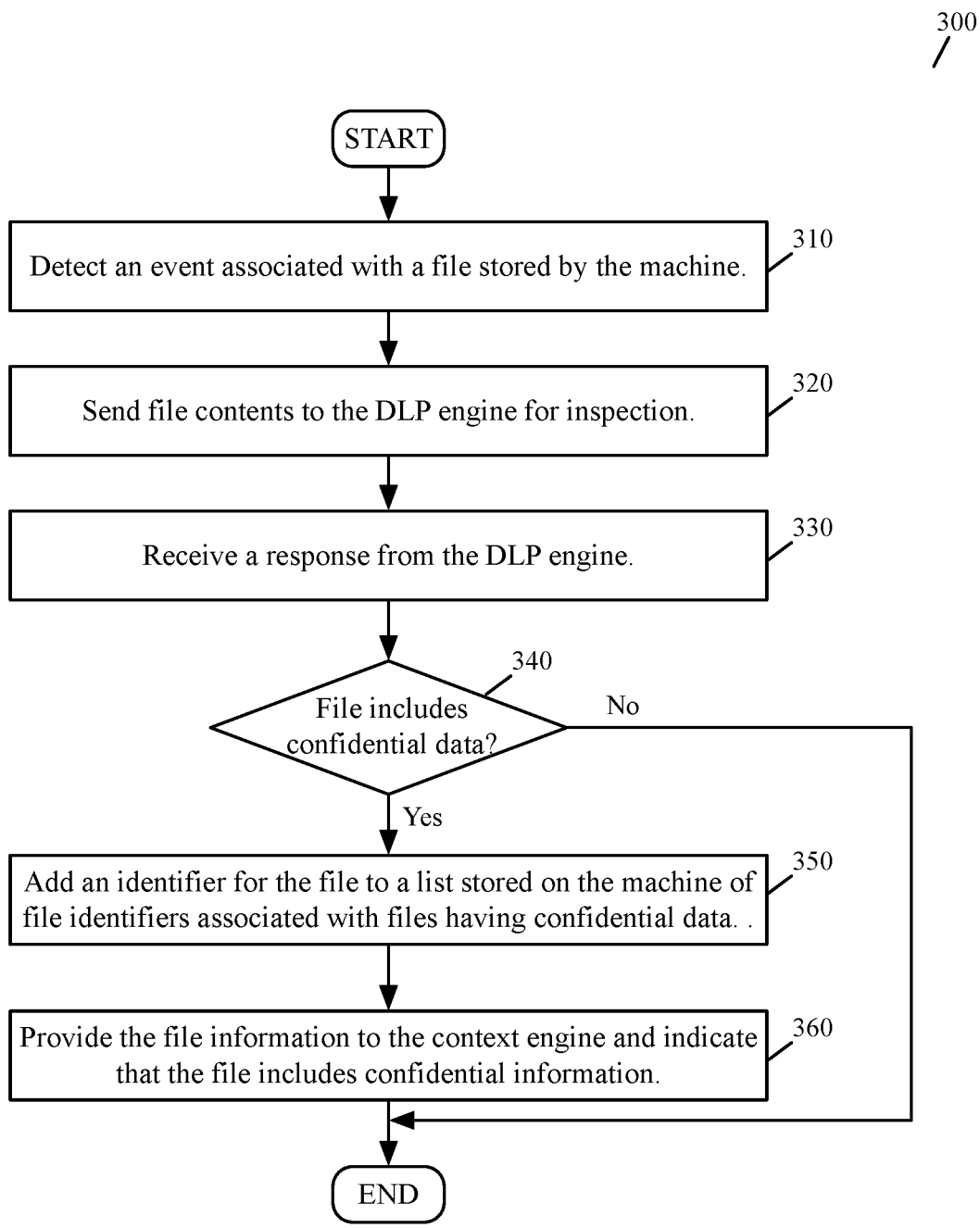
FIG. 3 illustrates a process performed in some embodiments to determine whether a file includes confidential data.

FIG. 3 illustrates a process performed in some embodiments to determine whether a file includes confidential data. The process 300 is performed by a GI agent executing on a machine, in some embodiments. The process 300 starts by detecting (at 310) an event associated with a file stored by the machine. In some embodiments, the event may be file access event, a file storage event, or a file interception event. For example, the GI agent may detect that a user is attempting to upload a confidential file at a location external to the datacenter in which the machine that stores the file executes when a file transfer process associated with the upload tries to access the file.

In response to the detection, the process sends (at 320) the file's contents to a DLP engine for inspection. For instance, the GI agent 250 can detect that the file event interception component 270 of the VM 205 has intercepted a file event, and provide contents of the file associated with the file event to the DLP engine 160 for evaluation. In some embodiments, the GI agent 250 first checks the file cache and process ID storage 276 to determine whether an identifier for the file is already included in the list of files known to contain confidential information.

The process then receives (at 330) a response from the DLP engine, and determines (at 340) whether the response indicates the file includes confidential data. In some embodiments, the indication provided by the DLP engine is in the form of a tag on the file. When the process determines (at 340) that the file does not include confidential data, the process 300 ends.

When the process determines (at 340) that the file does include confidential data, the process transitions to add (at 350) an identifier for the file to a list stored on the machine of file identifiers associated with files having confidential data. In some embodiments, the GI agent also adds a process ID associated with the process that triggered the detected event to the list along with the file's identifier. The GI agent 250, for example, would add the file identifier and process identifier to the file cache and process ID storage 276, in some embodiments, when the DLP engine 160 indicates the file includes confidential information.

The process then provides (at 360) information regarding the file to the context engine and indicates that the file includes confidential information. In some embodiments, the GI agent provides the information to the context engine by providing a network or process event identifier that is associated with a set of attributes pertaining to the network event. The attributes, in some embodiments, include a five-tuple identifier (i.e., source port and IP address, destination port and IP address, and protocol) of the requested network connection (i.e., network connection initiated by the file access event), process identifier of the process requesting the network connection, a user identifier associated with the requesting process, a group identifier (e.g., an activity directory (AD) identifier) associated with the requesting process, and the indication as to whether the associated file includes confidential information. Following 360, the process 300 ends.

Figure 4:
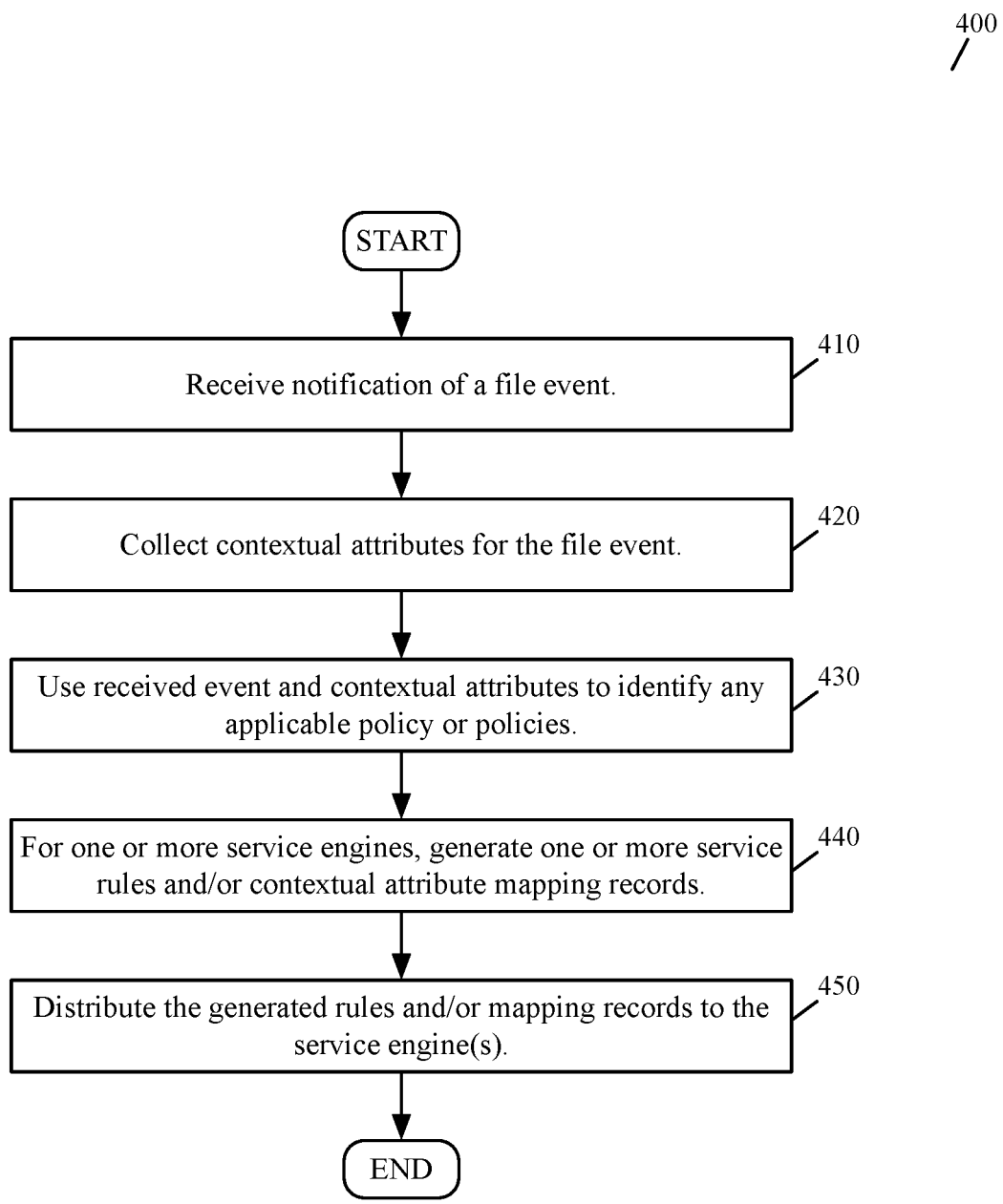
FIG. 4 illustrates a process for collecting attributes and distributing context-based service rules and/or mapping records defined for data messages associated with confidential information, in some embodiments.

FIG. 4 illustrates a process for collecting attributes and distributing context-based service rules and/or mapping records defined for data messages associated with confidential information, in some embodiments. The process 400 is performed by a context engine executing on a host computer that provides service rules to service engines on the host computer, in some embodiments.

The process starts by receiving (at 410) notification of a file event from a GI agent executing on a machine on the host computer. As described above for the process 300, the notification, in some embodiments, is an event identifier associated with a set of attributes pertaining to the file event. These attributes, in some embodiments, include an indication as to whether or not the file involved in the file event includes confidential information, a flow identifier associated with data messages corresponding to the file event, and a process hash that identifies the process associated with the file event.

The process collects (at 420) contextual attributes for the file event. As described above, the context engine, in some embodiments, directs the GI agent (i.e., the GI agent from which the original event notification was received) to collect from the OS modules additional process parameters that are associated with the process identifier (ID) that it received with the network event. These additional process parameters in some embodiments include the process name, the process hash (i.e., if not included in the first set of attributes provided by the GI agent), the process path with command line parameters, the process network connection, the process-loaded modules, and one or more process consumption parameters specifying the process' consumption of one or more resources of the machine (e.g., central processing unit consumption, network consumption, and memory consumption).

The process uses (at 430) the received event and contextual attributes to identify any applicable policy or policies. For instance, when the attributes include an indication that a file associated with the process includes confidential information, the context engine, in some embodiments, identifies policies specified for data messages associated with confidential information. In some embodiments, these policies include additional actions to be taken by service engines to ensure confidential data stored by machines on the host computer are protected, such as by blocking data messages associated with confidential information, or redirecting these data messages to a deep packet inspector for further inspection.

For one or more service engines executing on the host computer, the process generates (at 440) one or more service rules and/or contextual attribute mapping records. For example, one or more of the identified policies might specify that for a particular process or network event, a particular set of service engines need to be notified about the event (e.g., about a new data message flow), with each service engine receiving a subset of contextual attributes that are relevant for that service engine to perform its processing for that event. This operation in some embodiments involves the context engine not including attributes that are not relevant for each particular service engine in the subset of contextual attributes that it provides to that particular service engine.

In some embodiments, certain events might necessitate new service rules to be created for one or more service engines. For example, when a process attempts to access a confidential file, a policy might specify that all data messages from the VM that stores the confidential file be redirected to a deep packet inspector. In another example, when a high-threat application is identified on one VM, a policy might specify that other VMs on that host might have to start to encrypt their data message traffic. In some such embodiments, the context-engine policy storage 143 includes policies that direct the context engine to generate service rules for service engines under certain circumstances, or to direct the service engines to generate such service rules. For such embodiments, the process (at 440), if needed, generates service rules for service engines under certain circumstances, or directs the service engines to generate such service rules.

The process distributes (at 450) the generated rules and/or mapping records to the service engine(s). The service engines 130 in some embodiments receive and store the generated rules in the context based service rules storage 140 and store the mapping records in the attribute-mapping storage 223. In some embodiments, the mapping records include mappings between process identifiers and file identifiers for confidential files accessed, or attempted to be accessed, by the process corresponding to the process identifiers. Following 450, the process 400 ends.

Figure 5:
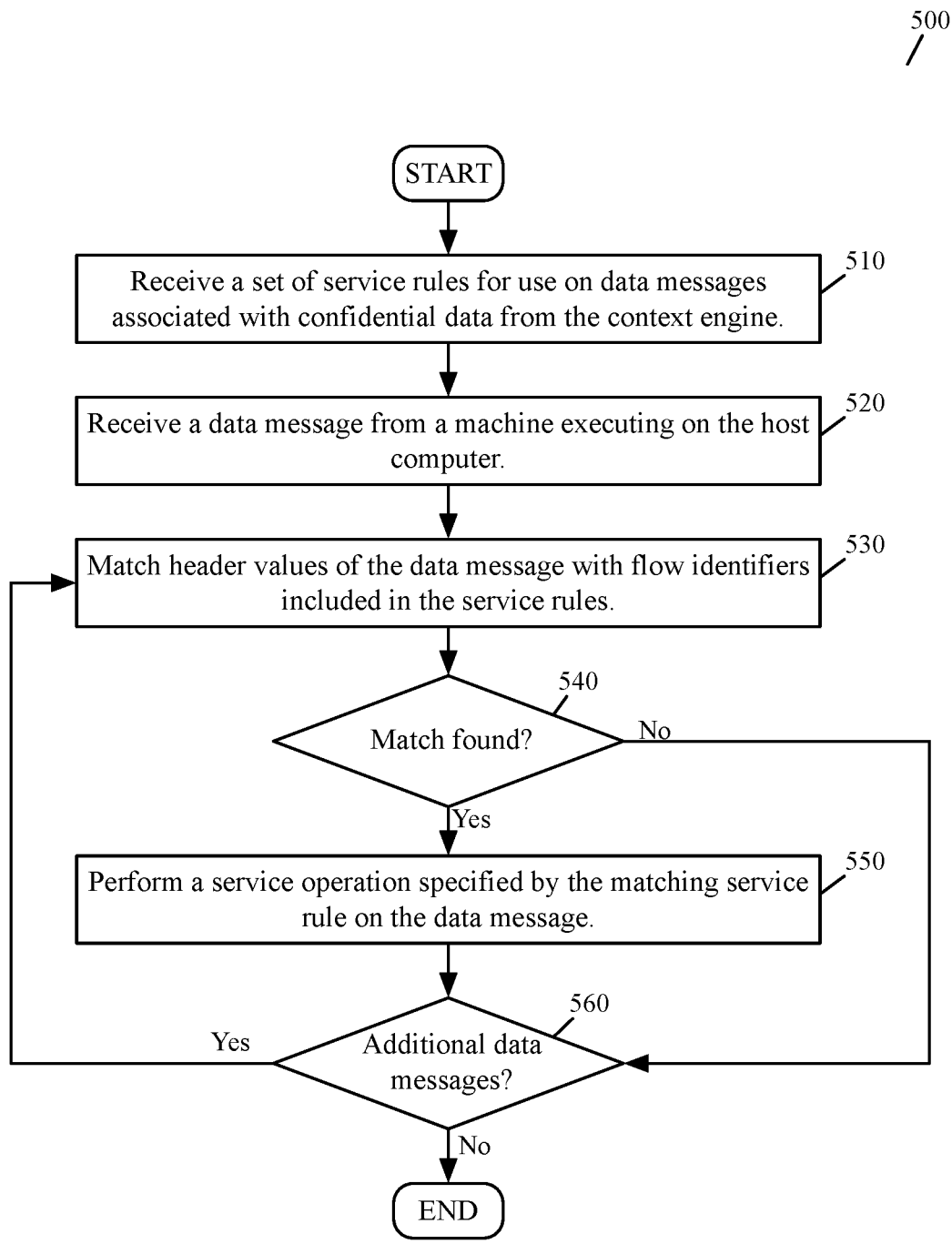
FIG. 5 illustrates a process performed by a service engine in some embodiments to enforce context-based service rules defined for ensuring confidential data stored by machines on a host computer remains secure.

FIG. 5 illustrates a process performed by a service engine in some embodiments to enforce context-based service rules defined for ensuring confidential data stored by machines on a host computer remains secure. The process 500 starts by receiving (at 510) from a context engine a set of service rules for use on data messages associated with confidential data.

The process receives (at 520) a data message from a machine executing on the host computer. In some embodiments, the data messages are sent to the service engines from ports of a forwarding element that forwards data messages for machines on the host computer. For instance, as described above, the port 260 of the SFE 210 receives data messages from the VM 205, and, in some embodiments, includes one or more function calls to one or more modules, such as the service engines 130, that implement I/O operations on data messages received at the port.

The process matches (at 530) header values of the data message with flow identifiers included in the service rules. A service engine 130, for example, can try to match the flow identifier (e.g., the five-tuple identifier) associated with a data message and/or the flow's associated context attribute set to the rule identifiers of its service rules in its context-based service rule storage 140. In some embodiments, the SFE port 260 that calls the service engine supplies a set of attributes of the data message. The set of attributes, in some embodiments, can include data message identifiers, such as traditional five-tuple identifiers.

The process determines (at 540) whether any matches are found. When the process determines (at 540) that no matches are found, the process transitions to determine (at 560) whether there are additional data messages to process. In some embodiments, the context-based service rule storage 140 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

When the process determines (at 540) that a match is found, the process transitions to perform (at 550) a service operation specified by the matching service rule on the data message. For example, when the data message is associated with a file containing confidential information, the match attributes may include an indication of association with confidential information, according to some embodiments. Examples of rules with such match attributes will be provided and discussed further below.

The process determines (at 560) whether there are additional data messages to process. The additional data messages, in some embodiments, can belong to the same flow, or different flows, than the data message that has just been processed, and can be associated with the same machine, or different machines. When the process determines (at 560) that there are additional data messages, the process returns to match (at 530) header values of the data message with flow identifiers included in the service rules. Otherwise, when the process determines (at 560) that there are no additional data messages, the process ends.

Figure 6:
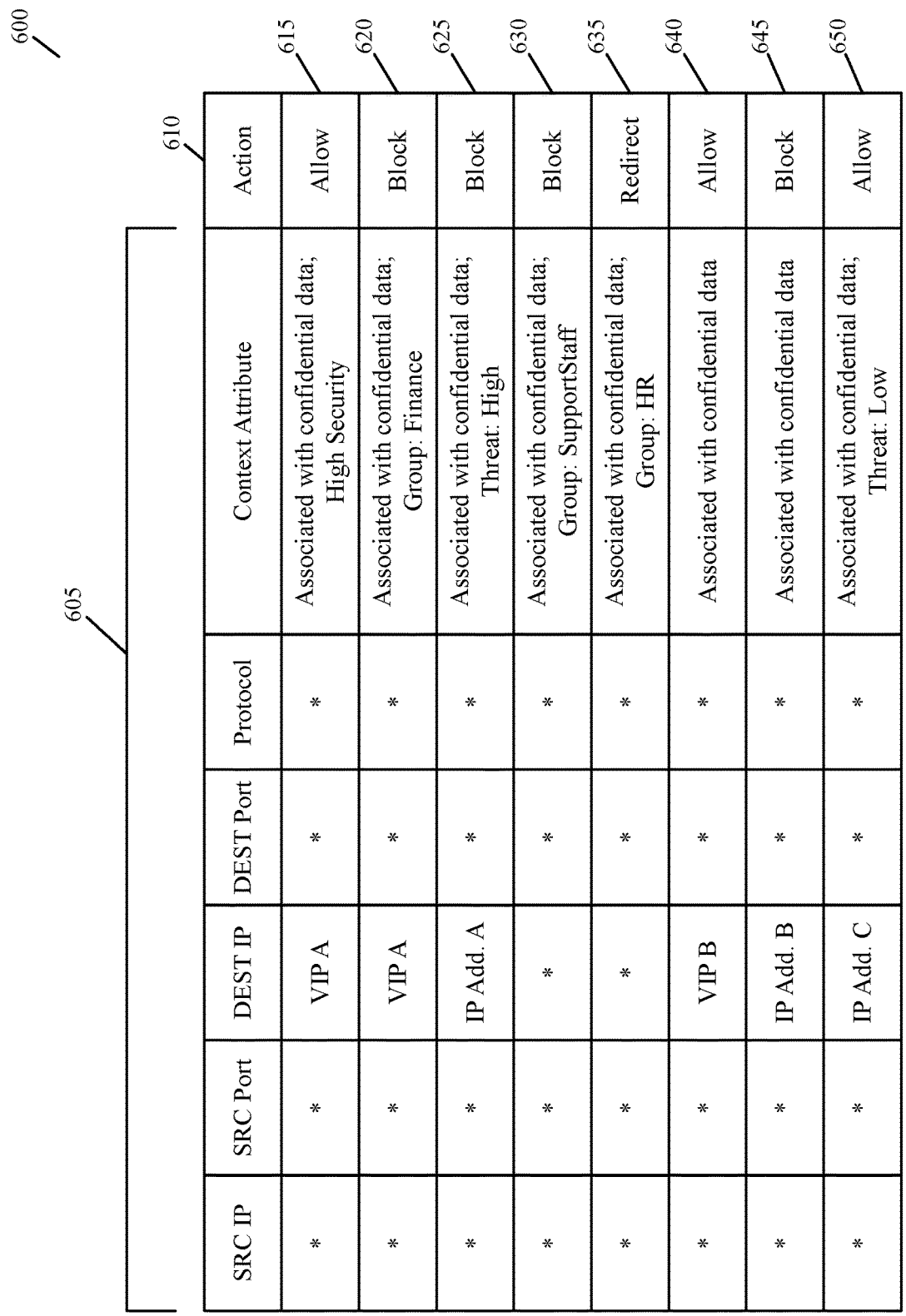
FIG. 6 illustrates several examples of firewall rules defined in terms of a data message's association with confidential data, in some embodiments.

FIG. 6 illustrates several examples of firewall rules defined in terms of a data message's association with confidential data, in some embodiments. In the set of example firewall rules 600, the rule identifier 605 of each rule is expressed in terms of the five-tuple identifier and one or more contextual attributes. Each rule has one or more attributes in its five-tuple identifier that are wildcard values designated by an asterisk in order to specify that the value of these attributes do not matter (i.e., the data message flow can have any value for these attributes without failing to match the rule). Additionally, each rule also specifies a firewall action parameter 610, as shown.

The first rule 615 is specified for data message flows that are destined for VIP A and is defined in terms of three contextual attributes, including whether the data messages are associated with confidential data and belong to the High Security group. The corresponding action for data messages that match the rule identifier for the rule 615 is to allow these data messages. In some embodiments, such rules are useful for ensuring that IT personnel or hackers, for example, cannot create a back door to access sensitive data by installing administrative processes that access high security VMs that piggyback off the login session of a user with the appropriate clearance. As mentioned above, and further described below, each time the firewall engine 128 identifies a new data message flow, it identifies the flow's contextual attributes by interacting with the context engine or by examining the records in its attribute-mapping storage 223 to identify a record that specifies the contextual attributes for the flow's five-tuple identifier.

The second rule 620 is also specified for data messages that are destined for VIP A and are associated with confidential data. Unlike rule 615, rule 620 is further specified for data messages having the group identifier Finance, and indicates such data messages should be blocked. As such, two data messages having the same destination and both being associated with confidential data may not have the same action applied based on other contextual attributes associated with said data messages.

The third rule 625 specifies that data messages that are destined for the IP address A, that are associated with confidential data, and are associated with processes that have a High threat level should be blocked. As mentioned above, the context engine 110 or service engines 130 can interact with threat detector 132 to assess the threat level associated with a process. In some embodiments, the threat detector generates a threat score, which the context engine, PC engine, or the other service engines quantize into one of several categories. For example, in some embodiments, the threat detector produces a threat score from 0 to 100, and one of the engines 110 or 130, designates scores between 0 and 33 to be a low threat level, designates scores between 34 and 66 to be a medium threat level, and designates scores between 67 and 100 to be a high threat level.

Figure 7:
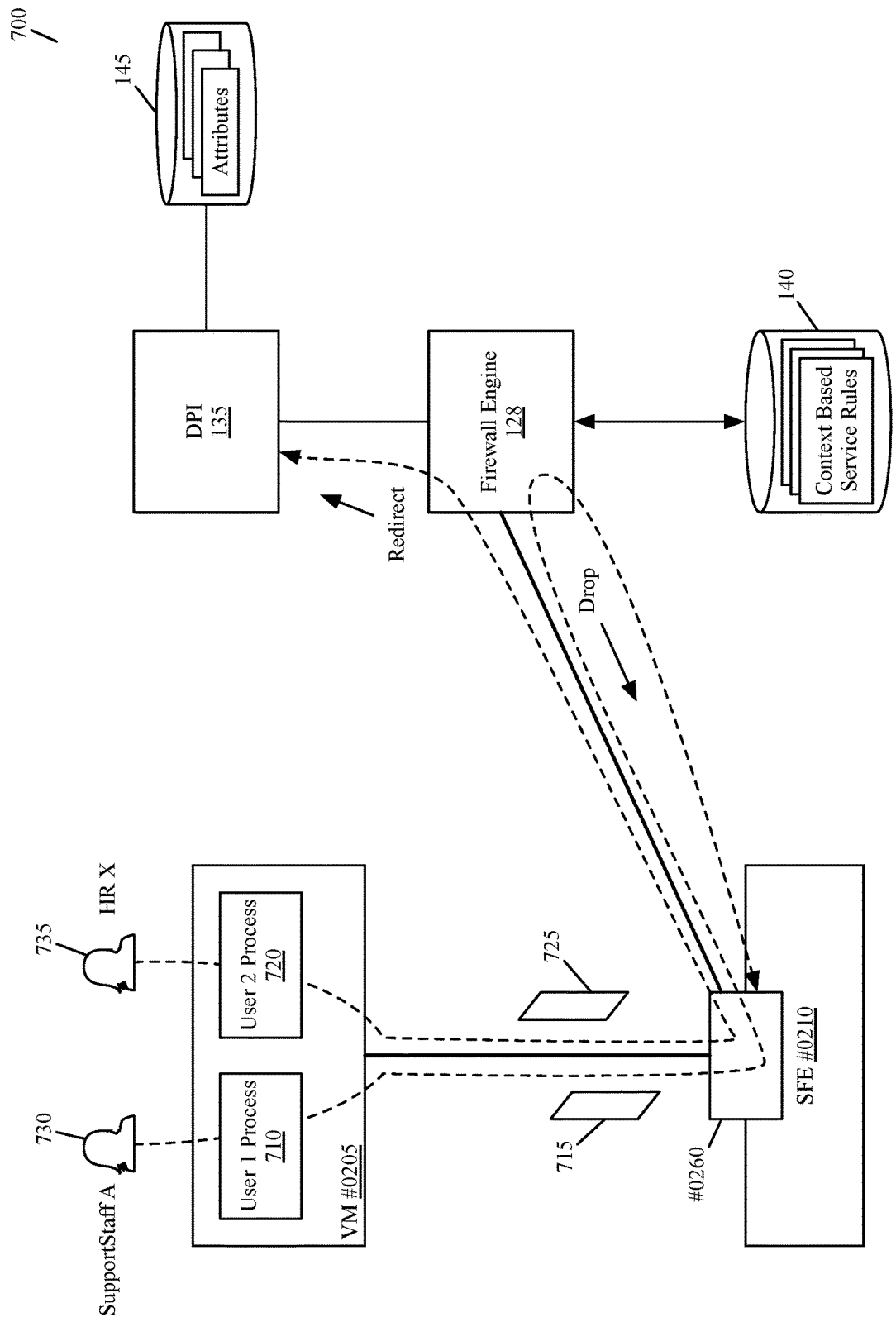
FIG. 7 presents an example diagram illustrating enforcement of the fourth and fifth rules of FIG. 6 by a firewall engine, in some embodiments.

FIG. 7 presents an example diagram 700 illustrating enforcement of the fourth and fifth rules 630 and 635 by the firewall engine 128, in some embodiments. The fourth rule 630 specifies that any data messages associated with confidential data and the group identifier Support Staff are to be blocked, while the fifth rule 635 specifies that any data messages associated with confidential data and the group identifier HR are to be redirected (e.g., to a DPI engine).

As shown by the diagram 700, two users 730 and 735 are logged into the same VM 205 that is acting as a terminal server. One of these users 730 is SupportStaff A and is associated with a first process 710, while the other user 735 is HR X and is associated with a second process 720. The firewall engine 128 blocks a first data message 715 from the SupportStaff A's session from reaching any destination, while redirecting a second data message 725 from the HR X's session to the DPI engine 135 for deep packet inspection, because the fourth rule 630 prevents data messages that are associated with the confidential data and the SupportStaff Group ID to reach any destination, while the fifth rule 635 requires data messages that are associated with the confidential data and the HR Group ID to be redirected for deep packet inspection.

In FIG. 7, the two data messages are for two different actual users who are concurrently logged into a VM. In other cases, only one user might be actually logged onto a VM, but administrative processes might be running on the VM in conjunction with the processes that run for the applications started by the logged in user. The administrative processes can be services/daemons running in a VM in a different user context than the logged in user. Services generally run in admin/root context and not in the logged in user context. This is a potential security hole as it might allow any application running in a non-logged on user context to access a network resource. Accordingly, even when only a single user is logged into a VM, it can be desirable to specify firewall rules that treat differently the data messages associated with background administrative processes from data messages associated with processes that run for the applications started by the logged in user.

Returning to the firewall rules 600, the sixth rule 640 specifies that all data messages destined for VIP B and associated with confidential data should be allowed. Conversely, the seventh rule 645 specifies that all data messages destined for IP address B and associated with confidential data should be blocked. In some embodiments, the destination VIP B may be a trusted destination, while the destination IP address B may be unknown or determined to be malicious. The eighth and final rule 650 specifies that all data messages destined for IP address C, associated with confidential data, and associated with processes determined to have a low threat level should be allowed. As mentioned above, threat scores between 0 and 33 may be specified as a low threat level, in some embodiments, based on designations by the context engine 110 or the service engines 130.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 8 conceptually illustrates a computer system 800 with which some embodiments of the invention are implemented. The computer system 800 can be used to implement any of the above-described hosts, controllers, gateway, and edge forwarding elements. As such, it can be used to execute any of the above described processes. This computer system 800 includes various types of non-transitory machine-readable media and interfaces for various other types of machine-readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) 810 may be a single processor or a multi-core processor in different embodiments. The read-only-memory (ROM) 830 stores static data and instructions that are needed by the processing unit(s) 810 and other modules of the computer system 800. The permanent storage device 835, on the other hand, is a read-and-write memory device. This device 835 is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory 825 is a volatile read-and-write memory, such as random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as touchscreens that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing services on a host computer on which a machine executes, the method comprising:
    sending, to a file inspector, a first set of data associated with an event detected on the machine that is associated with a file stored on the machine;
    receiving, from the file inspector, indication that the file stores confidential information; and
    sending, to a context engine executing on the host computer separately from the machine, a second set of data associated with the file, the second set of data comprising the indication that the file stores confidential information, the context engine storing the second set of data for subsequent access by a service engine that executes on the host computer separately from the machine, the service engine using the second set of data including said indication to perform a service operation on data messages associated with the machine.

2. The method of claim 1, wherein the data messages associated with the machine comprise data messages sent by the machine.

3. The method of claim 1, wherein the event comprises one of a file access event, a file storage event, and a file interception event.

4. The method of claim 1, wherein a list of files that store confidential data is stored on the machine, the method further comprising adding an identifier identifying the file to the list of files that store confidential data.

5. The method of claim 4, wherein the list of files that store confidential data further comprises a list of corresponding process identifiers that accessed files in the list, wherein adding the file's identifier to the list further comprises adding a process identifier associated with the event.

6. The method of claim 1, wherein the second set of data further comprises (i) a five-tuple identifier associated with the data messages and (ii) a process hash identifying a process associated with the event.

7. The method of claim 1, wherein the method is performed by a guest introspection (GI) agent executing on the machine.

8. The method of claim 7, wherein the machine is a virtual machine (VM) and the GI agent is installed on the VM.

9. The method of claim 7, wherein the machine is a container and the GI agent is a module executing within a memory space of the container.

10. The method of claim 1, wherein the service engine is a firewall engine and the service operation is a firewall operation.

11. The method of claim 10, wherein the firewall operation comprises a redirect operation for redirecting data messages to a deep packet inspector executing on the host computer.

12. The method of claim 1, wherein the file inspector comprises a data loss prevention (DLP) engine.

13. The method of claim 12, wherein the DLP engine executes on the host computer separately from the machine.

14. The method of claim 12, wherein the DLP engine executes outside of the host computer.

15. A non-transitory machine readable medium storing a program for execution by a set of processing units, the program for performing services on a host computer on which a machine executes, the program comprising sets of instructions for:
    sending, to a file inspector, a first set of data associated with an event detected on the machine that is associated with a file stored on the machine;
    receiving, from the file inspector, indication that the file stores confidential information; and
    sending, to a context engine executing on the host computer separately from the machine, a second set of data associated with the file, the second set of data comprising the indication that the file stores confidential information, the context engine storing the second set of data for subsequent access by a service engine that executes on the host computer separately from the machine, the service engine using the second set of data including said indication to perform a service operation on data messages associated with the machine.

16. The non-transitory machine readable medium of claim 15, wherein the data messages associated with the machine comprise data messages sent by the machine.

17. The non-transitory machine readable medium of claim 15, wherein the event comprises one of a file access event, a file storage event, and a file interception event.

18. The non-transitory machine readable medium of claim 15, wherein a first list of files that store confidential data and a second list of corresponding process identifiers that accessed files in the first list are stored on the machine, the program further comprising a set of instructions for adding (i) an identifier identifying the file to the first list and (ii) a process identifier associated with the event to the second list.

19. The non-transitory machine readable medium of claim 15, wherein the second set of data comprises (i) a five-tuple identifier associated with the data messages and (ii) a process hash identifying a process associated with the event.

20. The non-transitory machine readable medium of claim 15, wherein the file inspector comprises a data loss prevention (DLP) engine.

\* \* \* \* \*